(12) United States Patent
Steinder et al.

(10) Patent No.: US 9,800,465 B2
(45) Date of Patent: Oct. 24, 2017

(54) APPLICATION PLACEMENT THROUGH MULTIPLE ALLOCATION DOMAIN AGENTS AND FLEXIBLE CLOUD SCHEDULER FRAMEWORK

(71) Applicant: International Business Machines Corporation, Armonk, NY (US)

(72) Inventors: Malgorzata Steinder, Leonia, NJ (US); Asser N. Tantawi, Somers, NY (US)

(73) Assignee: International Business Machines Corporation, Armonk, NY (US)

( * ) Notice: Subject to any disclaimer, the term of this patent is extended or adjusted under 35 U.S.C. 154(b) by 340 days.

(21) Appl. No.: 14/542,103

(22) Filed: Nov. 14, 2014

(65) Prior Publication Data
US 2016/0142338 A1     May 19, 2016

(51) Int. Cl.
*G06F 15/173*     (2006.01)
*H04L 12/24*      (2006.01)
(Continued)

(52) U.S. Cl.
CPC ......... *H04L 41/0813* (2013.01); *G06N 7/005* (2013.01); *G06Q 10/10* (2013.01);
(Continued)

(58) Field of Classification Search
CPC ......... H04L 41/0813; H04L 41/410823; H04L 47/823; H04L 47/783; H04L 67/1023; G06N 7/005; G06Q 10/10
(Continued)

(56) References Cited

U.S. PATENT DOCUMENTS 5,390,188 A  *  2/1995  Dawson ............... H04L 43/0847
                                                            714/706
7,146,460 B2   12/2006  Korgaonkar
(Continued)

FOREIGN PATENT DOCUMENTS

EP      2 518 942 A1    10/2012

OTHER PUBLICATIONS

List of IBM Patents or Patent Applications Treated as Related.
(Continued)

*Primary Examiner* — Thu Ha Nguyen
(74) *Attorney, Agent, or Firm* — Scully, Scott, Murphy & Presser, P.C.; Rabin Bhattacharya, Esq.

(57) ABSTRACT

There are provided a system, a method and a computer program product for operating a cloud computing infrastructure. In one embodiment, the system and method performs allocation domain modeling and provides a cloud scheduler framework that takes as input desired optimization objectives and the workload constraints and efficiently produces a placement solution that satisfies the constraints while optimizing the objectives in a way that adjusts itself depending on the objectives. As the objectives change, e.g., due to actions from system administrators or due to changes in business policies, the system optimizes itself accordingly and still produces efficient and optimized placement solutions. The system and method constructs an Allocation Domain (AD) that is a particular facet for allocating a logical entity to a physical entity. An AD is created using: variables, functional definitions (functions of variables), and a policy specification that includes a Boolean expression (of the functional definitions).

22 Claims, 10 Drawing Sheets

(51) Int. Cl.
*G06N 7/00* (2006.01)
*G06Q 10/10* (2012.01)
*H04L 29/08* (2006.01)
*H04L 12/911* (2013.01)

(52) U.S. Cl.
CPC ........ *H04L 41/0823* (2013.01); *H04L 47/823* (2013.01); *H04L 67/1023* (2013.01); *H04L 47/783* (2013.01)

(58) Field of Classification Search
USPC ................. 709/226, 213; 710/36; 711/150
See application file for complete search history.

(56) References Cited

U.S. PATENT DOCUMENTS

| | | | |
|---|---|---|---|
| 7,694,303 | B2 | 4/2010 | Hahn et al. |
| 8,046,765 | B2 | 10/2011 | Cherkasova et al. |
| 8,291,159 | B2* | 10/2012 | Rajagopal ............ G06F 3/0605 709/226 |
| 8,935,393 | B1* | 1/2015 | Jackson ............. G06Q 30/0631 709/224 |
| 9,329,937 | B1* | 5/2016 | Grant ...................... G06F 11/14 |
| 2004/0133622 | A1* | 7/2004 | Clubb ..................... G06F 9/505 709/200 |
| 2004/0153407 | A1* | 8/2004 | Clubb .................... G06Q 40/02 705/41 |
| 2004/0236547 | A1* | 11/2004 | Rappaport ............ G06F 17/509 703/2 |
| 2006/0092847 | A1* | 5/2006 | Mohan ................ H04L 12/2602 370/241.1 |
| 2006/0285489 | A1* | 12/2006 | Francisco ........... H04L 12/2602 370/229 |
| 2007/0162602 | A1 | 7/2007 | Anderson et al. |
| 2008/0022282 | A1 | 1/2008 | Cherkasova et al. |
| 2009/0280823 | A1* | 11/2009 | Petrovic ................ H04W 68/02 455/453 |
| 2010/0091669 | A1* | 4/2010 | Liu ........................ H04L 45/20 370/252 |
| 2012/0066375 | A1* | 3/2012 | Phaal .................... H04L 43/022 709/224 |
| 2012/0290703 | A1* | 11/2012 | Barabash ................ H04L 63/20 709/223 |
| 2013/0247052 | A1* | 9/2013 | Ali ........................... G06F 8/30 718/102 |
| 2014/0162684 | A1 | 6/2014 | Shaw |
| 2014/0189684 | A1* | 7/2014 | Zaslavsky ........... G06F 9/45533 718/1 |
| 2014/0211811 | A1 | 7/2014 | Ludwig et al. |
| 2014/0213191 | A1* | 7/2014 | Courtice ............... H04W 40/12 455/67.11 |
| 2014/0222637 | A1 | 8/2014 | Giles |
| 2014/0226485 | A1* | 8/2014 | Heinz ................. H04L 41/0806 370/235 |
| 2015/0113619 | A1* | 4/2015 | Ramdass ................ H04L 63/04 726/6 |
| 2016/0044125 | A1* | 2/2016 | Hardin ................ H04L 67/2823 709/219 |
| 2016/0073286 | A1* | 3/2016 | Wang ................ H04W 28/0236 370/332 |
| 2016/0154673 | A1* | 6/2016 | Morris .................. G06F 9/5044 718/100 |

OTHER PUBLICATIONS

Arnold et al., "Workload orchestration and optimization for software defined environments," IBM J Res & Dev., vol. 58 No. 2/3 Paper 11, Mar./May 2014. pp. 11:1-11:11.
Berry et al., "Distributed approach to dynamic resource management based on temporal influence," Intelligent Systems Engineering 3.2 (Summer 1994), pp. 79-86.
Duvallet et al., "Imitation learning for task allocation," Intelligent Robots and Systems (IROS), 2010 IEEE/RSJ International Conference on. IEEE, Oct. 18-22, 2010, pp. 3568-3573.
MacArthur, "Multi-agent coordination for dynamic decentralised task allocation," Diss. University of Southampton, Dec. 2011.
Ortiz et al., "Dynamic resource-bounded negotiation in non-additive domains," Distributed Sensor Networks, Springer US, 2003, pp. 61-107.
Parkes et al., "An ironing-based approach to adaptive online mechanism design in single-valued domains," AAAI, vol. 7, 2007, pp. 94-101.
Tantawi, "A Acalable Algorithm for Placement of Virtual Clusters in Large Data Centers," 2012 IEEE 20th International Symposium on Modeling, Analysis and Simulation of Computer and Telecommunication Systems, (MASCOTS 2012)m Washington, DC, USA, Aug. 7-9, 2012.

\* cited by examiner

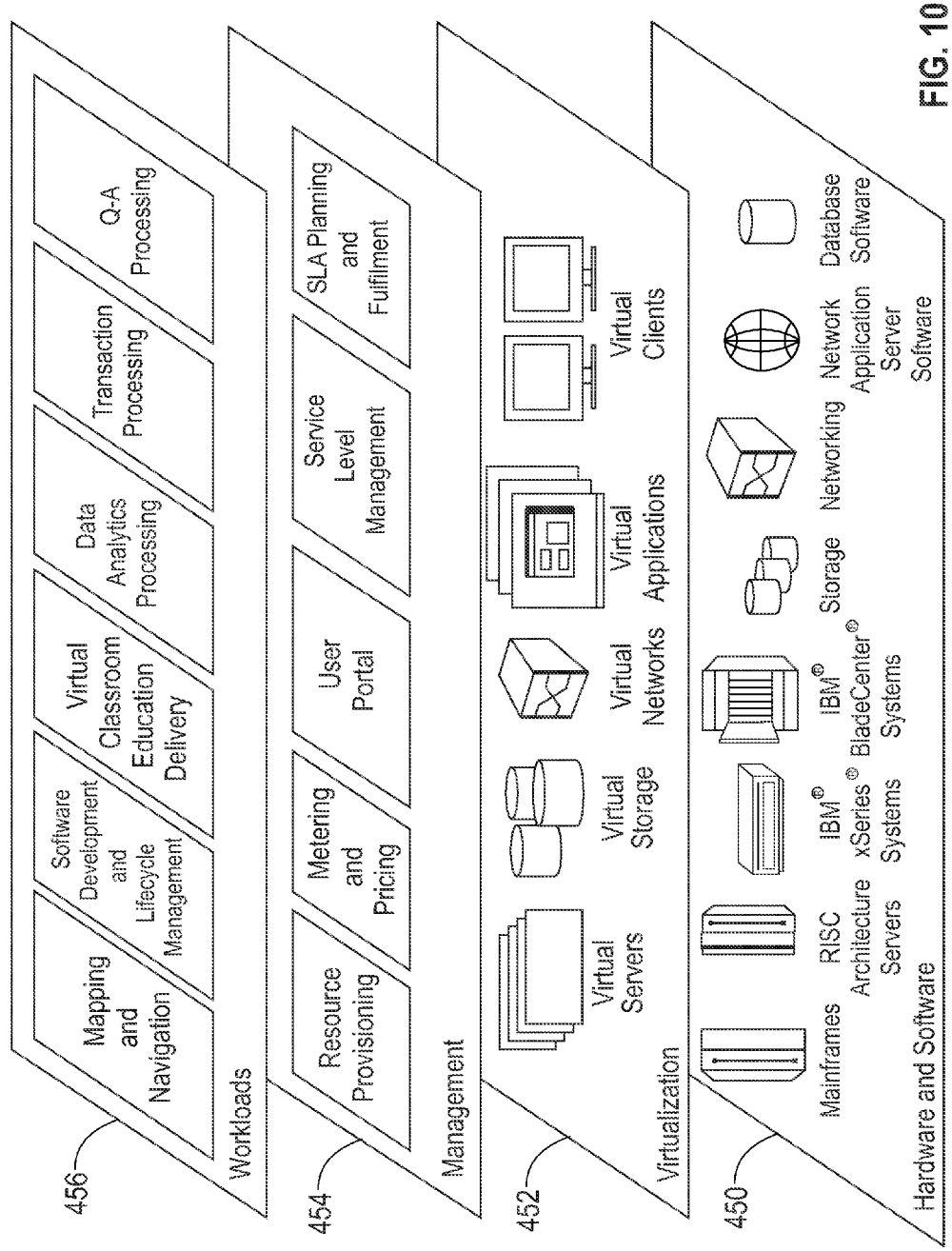

APPLICATION PLACEMENT THROUGH MULTIPLE ALLOCATION DOMAIN AGENTS AND FLEXIBLE CLOUD SCHEDULER FRAMEWORK

FIELD OF INVENTION

This disclosure relates to operating a cloud computing infrastructure and particularly to managing applications run in the cloud computing infrastructure.

BACKGROUND

In a cloud environment, the deployment of an application (workload) involves the allocation of resources in multiple domains. The most common domain is the domain of consumable resources, such as CPU cores, memory, and disk space. Traditionally, this domain has been the main factor in resource allocation problems. An application would specify its demand requirements for the various consumable resources, and a resource allocator, knowing the resources capacity and their current availability, allocates the required resources to the requesting application. In a cloud environment, in addition to consumable resource requirements, an application specifies other requirements and constraints. Consider, for example, an application (workload) which consists of a number of virtual machines and data volumes and services. Such Virtual Entities have resource requirements from their corresponding hosting Physical Entities, such as physical machines and storage devices. But, in addition, there may be some communications requirements among the logical entities, such as bandwidth and/or delay (requirements and constraints). Also, there may be location constraints specifying proximity of the LEs, for example an individual virtual machine (VM) to a data volume (DV) which holds the data processed by software running on that VM. Further, there might be availability and/or legal constraints for co-locating and antico-locating LEs in zones in the cloud infrastructure.

Current resource allocation schemes are typically concerned with only the allocation "domain" of placing of logical entities of the requested application on consumable physical resources. In case there are multiple domains, they are usually handled independently, making it hard, if not practically impossible, to best satisfy the requirements in all domains. Thus there is a need to dynamically introduce/alter a placement policy in a given allocation domain.

Further, cloud service providers need to accommodate an incoming stream of workload requests, each comprising a set of logical entities (LE), such as VMs and data volumes, and place them onto the cloud infrastructure which is a collection of physical entities (PE), such as physical machines (PMs) and storage devices (STGs). The workload request is encoded in some document defining the LEs, their resource requirements, as well as other constraints such as networking, affinity, licensing, multi-cloud, and cost. At the same time, the cloud provider has a multitude of objectives to satisfy, such efficiency of resource usage, quality-of-service, satisfy as much as possible users' requirements and constraints, and cost.

The problem is that the objectives/goals and related policies, for both cloud users and cloud service providers, are not necessarily fixed. Rather, they may change over time and may be revisited.

Devising a particular placement solution tailored to a given set of constraints and objectives may result in an inadequate management system.

A decade ago, researchers were concerned with placing individual virtual machines on physical machines. Requirements were simply stated as resource requirements. Such a placement problem is an instance of the bin packing problem (NP-hard). Several placement algorithms were designed to solve such problem efficiently. When a collection of virtual machines were considered as an application to be placed in the cloud, along with communication requirements among them, the problem became more complex, since the physical communication paths had to satisfy any virtual bandwidth requirements. Some heuristic optimization techniques were devised to solve such placement problem. However, adding location preference requirements, whereby one may specify a collocation (or anti-collocation) requirement at some level in the cloud hierarchical topology between a pair of virtual machines, makes the problem more complex.

While classes of solution algorithms exist that are based on clustering techniques, or based on reducing the size of the problem through analyzing the state of the cloud and identifying "cold spots" in the cloud that would be the domain of placement, such algorithms are usually designed given the constraints and objectives a priori. An optimization problem is formulated and a particular algorithm that suits the nature of the problem is sought.

SUMMARY

There are provided a system, methodology and a computer program product for operating a cloud computing allocation system.

In one aspect, the cloud computing allocation system and methodology implements Allocation Domains (AD), where an AD represents a particular facet of allocation. The particular AD is to be managed by a respective AD Agent (ADA) that determines viability of placing logical entities solutions on physical entities in the cloud infrastructure.

The system and method further provides for dynamically creating/modifying allocation policies (APs) that specify allocation requirements/constraints in each allocation domain. The APs reflect current cloud user and cloud provider requirements and constraints, and the system and method provides for automatically incorporating new/modified AP in a corresponding allocation domain when placing applications on a cloud infrastructure.

Any type of requirements/constraints may constitute an allocation domain, e.g., consumable resources AD, networking AD, location AD, and availability AD. While there are many more types of requirements/constraints, others of note include shared resources AD, properties AD, and security AD.

There is further provided a system, method and computer program product that provides a cloud scheduler framework which supports flexible workload objectives.

Such a cloud scheduler framework receives as input desired cloud user and cloud provider optimization objectives and the workload constraints and efficiently produces a placement that satisfies the constraints while optimizing the objectives in a way that adjusts itself depending on the objectives. As the objectives change, e.g., due to actions from system administrators or due to changes in business policies, the system optimizes itself accordingly and still produces efficient and optimized placement solutions.

The system, method and computer program product further provides a cloud scheduler framework that is applicable to assignment problems. In such problems, a number of variables, each having a domain of discrete values, have to be set in a way to optimize some objective function. The system and method implements a biasing function for each of the variables, having the domain of the variable as its domain and probability values as its range.

Thus, given a data center (or cloud), comprising physical entities (e.g., computing machines, storage devices, and network links), and virtual clusters (workloads), comprising virtual entities (e.g., virtual machines, data volumes, and virtual networks), there is provided a cloud management system including a placement engine, and assignment optimizer, that implements methods to assign virtual to physical entities, such that it accommodates different requirements and objectives; uses a flexible optimization algorithm that solves a customizable optimization problem; allows a pluggable optimizer; and performs initial (pre-) as well as on-going, dynamic (re-) assignment (migration).

In one aspect, there is provided a system and method for operating a cloud computing system. The method comprises: receiving a user application request having one or more user specified objectives and allocation constraints, the user request specifying requirements for placing logical entities on physical entities in a computing infrastructure; generating one or more bias weights based on the user specified objectives and allocation constraints; computing a probability distribution using the bias weights, the bias weights increasing likelihood of generating an optimized placement solution; generating, using the biased computed biased probability distribution, several sample placement solutions that satisfy the user specified allocation constraints; obtaining an optimized placement solution from the several sample solutions that satisfies all the user specified objectives; and dynamically reconfiguring the computing infrastructure by allocating the logical entities in the request to the physical entities based on the optimized placement solution, wherein a programmed processor device performs one of the receiving, the bias weight generating, the computing, the sample placement solution generating, the obtaining, the optimizing and the reconfiguring.

In a further aspect, there is provided a system and method for operating a cloud computing system. The method comprises: receiving a user application request having one or more user specified objectives and allocation constraints, the request specifying requirements for placing logical entities on physical entities in a computing infrastructure; constructing an allocation domain (AD) corresponding to each received user specified allocation constraint, each AD representing a particular allocation of a LE to a PE in a placement solution in the computing infrastructure; dynamically creating an allocation policy specific to an allocation domain; and evaluating each the generated sample placement solutions against an allocation policy corresponding to each the one or more allocation domains for a particular received application request to ensure compliance of the allocated constraints in the cloud infrastructure, wherein a programmed processor device performs one of the receiving, constructing, creating, and evaluating.

In a further aspect, there is provided a system and method for operating a cloud computing system. The method comprises: receiving a user application request having one or more user specified objectives and allocation constraints, the user request specifying requirements for placing logical entities on physical entities in a computing infrastructure; generating one or more bias weights based on the user specified objectives and allocation constraints; computing a probability distribution using the bias weights, the bias weights increasing likelihood of generating an optimized placement solution; generating, using the biased computed biased probability distribution, several sample placement solutions; evaluating, the several sample placement solutions, using an objective function based on a combination of the user objectives and allocation constraints, and obtaining the optimized placement solution based on the objective function evaluating that satisfies combined user specified objectives and the user specified allocation constraints given a current state of resources in the computing infrastructure; and iteratively repeating the probability distribution computing using the bias weights, the generating several placement solutions and the evaluating optimizing to obtain the optimized placement solution that satisfy the user objectives and constraints; and adjusting, at each iteration, the bias weights to generate more optimized sample placement solutions at each successive iteration; and dynamically reconfiguring the computing infrastructure by allocating the logical entities in the request to the physical entities based on an optimized placement solution, wherein a programmed process device performs one of the receiving, the bias weight generating, the computing, the sample placement solution generating, the obtaining, the iteratively repeating, the adjusting, and the reconfiguring.

A computer program product is provided for performing operations. The computer program product includes a storage medium readable by a processing circuit and storing instructions run by the processing circuit for running one or more methods. The methods run are the same as listed above.

BRIEF DESCRIPTION OF THE DRAWINGS

These and other objects, features and advantages of the present invention will become apparent from the following detailed description of illustrative embodiments thereof, which is to be read in connection with the accompanying drawings, in which:

FIG. 10 depicts abstraction model layers according to an embodiment.

DETAILED DESCRIPTION

Figure 1:
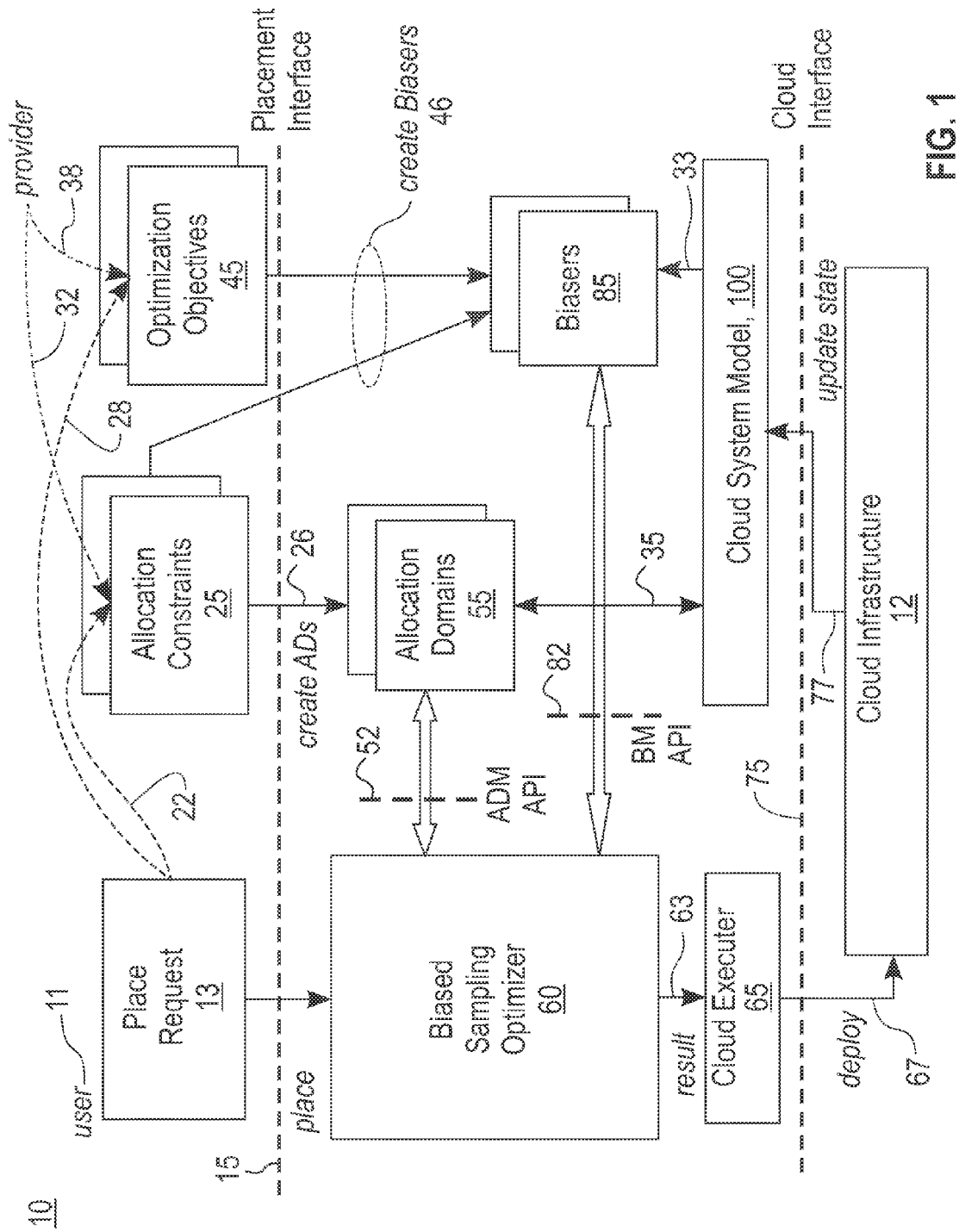
FIG. 1 depicts a cloud resource management system according to one embodiment.

The present disclosure provides systems and method that addresses the problem of optimally placing applications (workloads) in a cloud environment.

Terminology is provided. The following terms may be used interchangeably herein depending on the context: a Physical Entity (PE) which is a container or host, e.g. a physical machine (PM), a storage unit; a Logical Entity (LE) which is a hosted element, e.g. a virtual machine (VM), volume; a Logical Group (LG) which is a collection of homogeneous LEs (e.g., one or more); a Pattern (P) which is a collection of LGs (e.g., one or more); an Allocation (A) which is a mapping of LE to PE; a Resource (R): There may be several types of resources, such as consumable and property. A consumable resource has a capacity of units to be used by a request with a particular amount of demand units. (Overflow may be allowed.) Examples of consumable resources are CPU cores and memory. A property resource is a resource whose existence may be demanded by a request. Examples are storage types such as SSD, disk. (A property resource is a special case of a consumable resource where its capacity is one if it exists, the demand is one, and unlimited overflow is allowed); a Shared Resource (SR) wherein the term "shared" applies to a PE. In other words, SR is a R that may be used by multiple PEs, as opposed to the commonly understood R dedicated to a PE; a Containment Tree (CT) is a hierarchical tree topology where the leafs are PEs. The internal nodes in the tree may be entities such as blade centers, racks, systems, data centers, zones, regions, and clouds. The tree may or may not be balanced; a Level (L) is a reference to a level of a node as its height in the tree, where a leaf has a level 0.

Constraints involving a collection of LEs to place them on PEs that are at some level in the topology containment tree (CT) constitute level placement policies. Such a policy defines (1) the collection of LEs, (2) the level L, (3) the direction, and (4) the hardness of the constraint. The smallest collection of LEs consists of a pair of LEs, e.g., LE1 and LE2. In such a case, if placed on PE1 and PE2, respectively, the constraint relates to the level of PE1 and PE2 in the CT. The collection could also refer to a group(s) of homogeneous LEs. In this case, the constraint could be either applied within the group (intra-group constraint) or between two groups (inter-group constraint). The level L, is the lowest level in the CT where two PEs, as leaves (level 0) in the tree, have their common ancestor (predecessor) meet. The direction refers to whether the constraint requires collocation or anti-collocation, also known as affinity and anti affinity. For example, two LEs collocated (anti-collocated) at the rack level constraints the PEs where the LEs are placed to be within (beyond) the same rack. And, the hardness of the constraint refers to whether the constraint is hard, i.e. has to be satisfied, or soft, i.e. the constraint is to be satisfied as best as possible.

In one embodiment, a LE has a unique ID that points to its resource requirements in a cloud system model representing a cloud infrastructure. The LE may additionally point to a pattern it belongs to, the pattern having a unique ID [name] and holding information about its constituent LEs and their grouping structure. In addition, the pattern holds relationship requirements among the LEs (e.g., specified at the granularity of a pair of LEs intra- and inter-groups of LEs). Further, a PE additionally has a unique ID and it points to the hosted LEs on it. The PE also has a client reference to every domain it belongs to.

In one embodiment, an application (workloads) to be placed in a cloud environment is a collection of logical entities (LEs), e.g., made up of VM, DVs, services and other components (of an application) once deployed on a cloud. A cloud provider is an infrastructure providing PEs, e.g., PMs, STGs, network links, etc. components that make up the physical infrastructure, a datacenter, or collection thereof (making up a cloud). The systems and methods described herein address how to place each of the components of the application (LEs) to be hosted on a proper PE. The LE's have some resource requirement and when placed on an available PE, consumes resources when placed on the available PE, and in one aspect this is a simple matching of resources to resource requirements.

However, in the cloud there is much more resources that have to be satisfied, e.g., related to availability, security, cost, etc. In one aspect, these are divided into allocation domains (AD) and an algorithm for making placement is not involved with the specifics of the domain, but is provided with a common interface to multiple allocation domains implemented through agents (for each allocation domain) that is consulted by the placement algorithm to determine if that particular allocation domain can accommodate the (workload) request that is specified in the application. Thus, a level of uniformity is achieved across all domains.

FIG. 1 shows a cloud resource management system 10 implementing methods that address the placing applications (workloads) 20 in a cloud environment comprising a cloud infrastructure 12. Cloud Infrastructure 12 comprises the physical cloud, including, but not limited to PMs, STGs, networks, software, management, as operated by a cloud provider, where patterns are hosted (placed). Cloud Interface 75 is an API for deploying LEs into the Cloud Infrastructure 12 and accessing its configuration and state as it changes over time. The cloud is configured to provide such state information such as by communication paths 33, 35. A Cloud Executor 65 is a component which effects a particular placement solution 67 of an LE into a PE through the Cloud Interface deployment API 75.

A Cloud System Model (CSM) 100 is a soft representation of the configuration and state of the Cloud Infrastructure 12, periodically updated through the Cloud Interface 75 API. The CSM 100 is also altered by ADs to reflect particular allocation, yet to be executed.

Via the cloud deployment interface 75, an end user, application provider, service provider, platform provider, or like entity 11 may places an application request 20 via a placement interface 15, e.g., provided via a display. The application request includes a collection of logical entities (LEs), e.g., made up of VM, DVs, services and other components (of an application) deployed on the cloud infrastructure 12 that consumes PE resources. A cloud provider is an infrastructure providing PEs, e.g., PMs, STGs, network links, etc. and components that make up the physical infrastructure, a datacenter, or collection thereof (making up the cloud) 12.

In one embodiment, via an infrastructure 13 for placing end-user requests 20 for deployment of an application on cloud infrastructure 20, an end user placed application request 20 specifies or implies a specification 22 of allocation constraints 25 and specification 28 of optimization objectives 45, e.g. for an application to be deployed. A request may include a cloud end-user 11 placing (deploy) an application (workload, pattern) into the Cloud Infrastructure 12.

Such allocation constraints 25 include, but are not limited to: workload constraints, processing element constraints, e.g., CPU, memory capacities, network and communication connectivity constraints, e.g., capacity constraints for communicating over network links, or flow rates, also other constraints such as CPU load balancing, and energy use minimization constraints, reliability constraints, budget constraints, legal constraints, etc.

A service or infrastructure provider 17 who manages the cloud platform (infrastructure 12) may also specify or request 32 certain allocation constraints 25.

In one embodiment, the requests 20, including allocation constraints 25 may be written in some specification language (XML-like, e.g. HOT Heat Orchestration Template), describing the pattern, LE resource requirements, and other constraints related to placement of LEs (e.g. communications, proximity, location, security). Desired optimization objectives 45 may be explicitly and/or implicitly specified 28 in a user request 20 and/or explicitly specified 38 by an infrastructure provider 17. Optimization objectives may include, but are not limited to: objectives pertaining to the analysis and prediction, planning, scheduling and execution of applications on cloud computing infrastructure 12.

More particularly, an allocation constraint 25 is a class of allocation constraints which corresponds to an Allocation Domain. An Allocation Domain is a particular facet for allocating an LE to a PE. One AD is created for each class of Allocation Constraints. An allocation domain is created using: primitive variables, functional definitions (functions of primitive variables), and a policy specification, that in one embodiment, includes a Boolean expression (of the functional definitions) and post allocation changes to the primitive variables.

More particularly, the Allocation Domain consults the current state of the CSM 100 to check validity of a given proposed allocation, and makes appropriate changes to the CSM, reflecting changes, once an allocation is selected. Allocation constraints 25 must be adhered when the system allocates cloud resources to comply with both end-user application requests and provider requests.

More particularly, optimization objectives 45 are set by the cloud users 11 and the cloud (infrastructure) provider 17. An optimization objective is a particular component of an overall objective function of the placement optimization problem. Optimization objectives 45 must be satisfied when the infrastructure allocates cloud resources to comply with user applications requests 20. In addition, an infrastructure provider 17 who manages the cloud platform or infrastructure may also specify 38 certain optimization objectives 45.

In one embodiment, the end user requests 20 of the system are placed through the placement interface 15 to a biased sampling optimizer component 60. The biased sampling optimizer component 60 implements a methodology to find an optimized placement solution for the requested application 20. Once an optimized placement solution 63 is determined from biased sampling optimizer component 60, it is provided to a cloud executer component 65 which controls deployment 67 of the placement solution including resource allocation decisions within the cloud infrastructure 12, given the optimization objectives and the workload constraints, e.g. for the requested application to be deployed.

In one embodiment, via the placement interface 15, the allocation constraints 26 are specified by a user or provider and are used to create the allocation domains (ADs) 55. The system and method 10 particularly deploys an application involving allocating resources in multiple allocation domains 55 wherein each allocation domain represents a particular facet of an application's resource allocation.

In the system 10 of FIG. 1, each AD 55 is shown in operative communication with the biased sampling optimizer component 60 via an application programming interface (API) 52. As further shown in FIG. 3, allocation domains $55_1, \ldots, 55_N$ are each shown being managed by a respective Allocation Domain Agent (ADA) 57 and all agents are managed via communications paths 56 by an AD Manager (ADM) component 59. The architecture of the various ADAs and ADM provides defined common interfaces, and further provides a realization of specific ADAs as applied to the cloud environment. There is further provided a methodology for adding and deleting of ADAs via the placement interface 15.

The ADA implements the ADM API interface 52, in order to be queried by the ADM. The logic of each AD is maintained in the implementation of its ADA. The application placement algorithm run at the Biased Sampling Optimizer 60 is not involved with specifics of a domain but has a common interface to multiple of the allocation domains implemented though the AD agents consulted by the placement algorithm whether a particular allocation domain is able to accommodate the request specified in the application. The Allocation Domain Manager (ADM) is the one point interface between the Biased Sampling Optimizer 60 and the Allocation Domains 55. It implements the ADM API interface 52. The ADA of each AD registers with the ADM.

Figure 3:
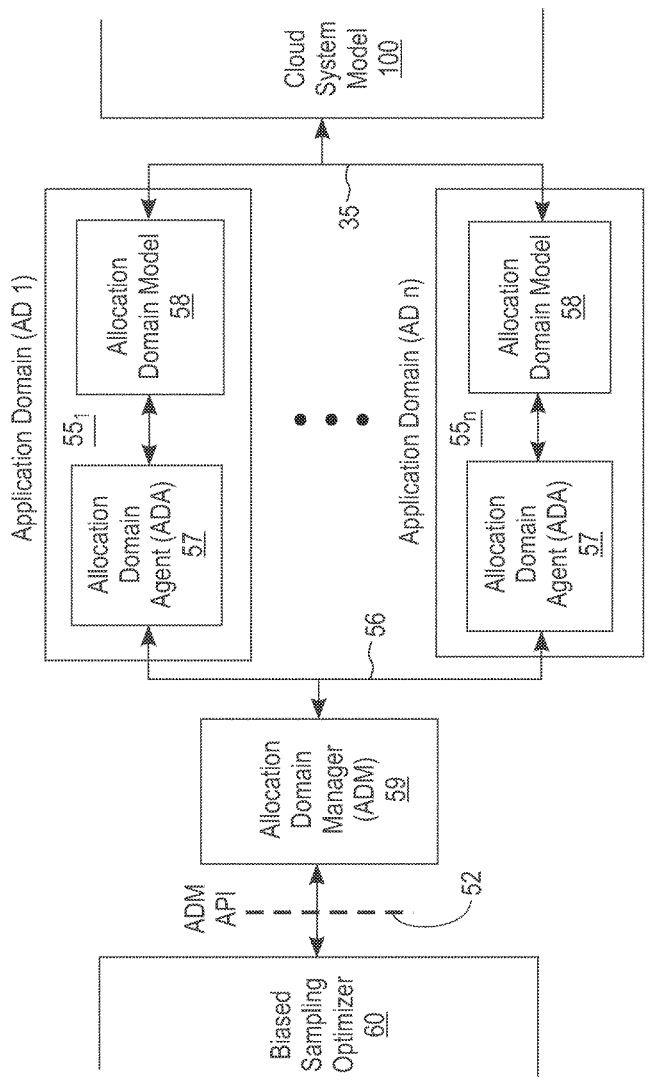
FIG. 3 depicts the allocation domain component of the system of FIG. 1 according to one embodiment.

As shown in FIG. 3, within each allocation domain $55_1, \ldots, 55_N$, the ADA 57 cooperatively interacts with a corresponding Allocation Domain Model 58 in order to provide an allocation decision and/or implement an allocation policy (AP) for that particular allocation domain. The Allocation Domain Model 58 includes and maintains data specific to the AD. Namely, this includes data about primitive variables, functional definitions, allocation policy (AP) specifications, e.g., a Boolean expression of the functional definitions, and post allocation changes to the primitive variables. All other data is accesses through the CSM. The system and method provides for the dynamic creation and alteration of Allocation Policies (APs) in a corresponding AD.

FIGS. 1 and 3 further depict the various ADs that operatively communicate via communication lines 35 to obtain current cloud infrastructure status from the cloud system model 100 that represents a current state of the cloud.

Further, the system 10 and methodology implemented provides for the automatic incorporation of and creation/modification of an AP in a given AD in a solution of a particular resources placement problem of an application in the cloud. The solution includes: 1) a method for the architecture of the various ADAs and the ADM; 2) the common interface to the ADAs and the ADM; and 3) a realization of specific ADAs as applied to the cloud environment.

Figure 5:
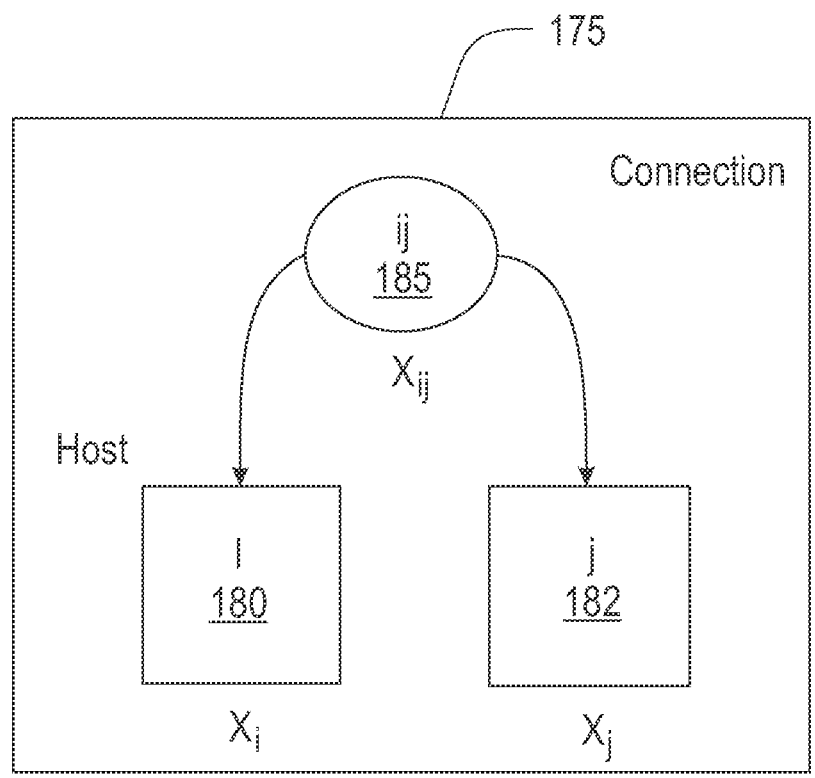
FIG. 5 generally depicts an allocation domain model 58 implementation for the cloud computing system of FIG. 1.

In the architecture, the allocation domain model 58 implementation is depicted generally in FIG. 5 which shows a high-level generic allocation domain setup 175 involving physical entities 180, 182 representing a respective host i, j or PM i, j, and a (physical) communication connection entity 185, representing a link or path in a network between the two hosts i and j. A collection of primitive variables Xi and Xj are related to the respective physical entities, e.g., a host i 180 or host j 182, and include data representing an amount of resources on the PE (e.g., CPU, core utilization, a memory size, etc.) which primitive variable is specific to or relating to the PE. Primitive variables are associated with a pair of host devices may include a variable Xij which is a 2D construct relating to two or more consumable resources PEs (hosts), e.g., a communication connection entity (link or path between two nodes). These variables are measureable and obtain a metric as to a variable value at an instant of time.

In one embodiment, functions are defined on the variables, and include a univariate function, i.e., they are functions of a vector or array Xi, or are bivariate functions that are functions of a matrix or array related to two or more nodes Xij. Multi-variate functions may further be defined to set forth variables relating to more than two hosts, for example.

In one embodiment, after functions are defined, the allocation policy is an outcome of a Boolean expression (e.g., true or false) on those defined functions.

Additionally, when a placement decision is made, there is also defined what changes happen to the variables.

Instantiations of these variables and functions are provided as examples. An allocation constraint of consumable resources (e.g., CPU, memory size), Xi include variables relate to resource availability, resource requirement, and the function becomes a single resource or the difference between availability and demand. Thus, for a consumable resources AD, primitive variables may include an array or vector "$X_i$" representing one or more of resource availability on PE i; resource demand of LE. The function defined for the consumable resources AD for LEs to be allocated on PE resources, is univariate:

$f(i)$=availability−demand. a.

The AD allocation policy specification may be a Boolean expression used to evaluate the function:

$f(i)>=0$ a.

which is satisfied as long as $X_i$ variable indicates a resource availability that is greater than the demand. If such is the case, and f(i)>0 evaluates as true, the allocation policy is satisfied and the placement condition can be made for that consumer resource AD. Then, as a further side-effect, resulting from the placement decision, the $X_i$ variables for resource availability are decreased by the demand values.

In a further example, for a networking AD, primitive variables may include a matrix "$X_{ij}$" representing a network path availability between PE i and PE j and a bandwidth demand between LE i and LE j. The function defined for the network path availability AD for LEs to be allocated on PE resources, is bivariate:

$f(i,j)$=availability−demand. a.

The networking AD allocation policy specification may be a Boolean expression used to evaluate the function:

$f(i,j)>=0$ a.

which is satisfied as long as $X_{ij}$ variable indicates a network path availability between the two physical entities, i.e., hosts i and j, that is greater than the demand. If such is the case, and f(i,j)>0 evaluates as true, the allocation policy is satisfied and the placement condition can be made for that consumer resource AD. Then, as a further side-effect, resulting from the placement decision, the $X_{ij}$ availability variables for network path availability are decreased by the demand values.

In a further example, for an Availability AD, primitive variables may include a matrix "$X_{ij}$" including variables representing an least common predecessor level, L, e.g. leaves in the hierarchical topology tree between leaves PE i and PE j and a desired level range, R, between LE j and LE j (e.g., defined by colocation, anti-colocation constraints). The function defined for the availability AD for LEs to be allocated on PE resources, is bivariate:

$f(i,j)$=deviation(L,R) a.

For example, the new placement request may specify a constraint that the placement of the two LEs on two VMs must be far apart, e.g., may not be in the same server rack, nor same room, nor same data center, or same town. The hierarchical (topology or containment) tree of the PEs is formed with the PE's being the leaves of the hierarchical tree. Placing two LEs on two PEs, the requirement or constraint is that these two leaves have to meet at a node at some level in the tree (i.e., the least common predecessor level), and the higher the level the higher the availability of the placement due to the PEs being further away from each other. Generally, an internal node in the tree may represent an entity such as blade centers, racks, systems, data centers, zones, regions, and clouds. The tree may or may not be balanced. To find the node, taking any two leaves $PE_i$ and $PE_j$, a method walks up from the PE leaves root of tree (e.g., at a level 0) to some height, i.e., level L. Thus, the variable becomes L, and a desired level may be a specified range R, e.g., two LEs being on a same zone or same rack, or a distance apart, etc.

For the tree topology AD model, representing the containment (topology) hierarchy, the system 10 implements a topology domain agent for performing associated operations on a tree including, but not limited to: getHeight(node), getLeaves(node), and getLowestCommonPredecessor (node1, node2), etc.

The evaluation expression determines what is the deviation between L, R to satisfy the constraint. For example, it can be a hard constraint, e.g., 0 or no deviation between L and R. Thus, for example, the networking AD allocation policy specification may be a Boolean expression used to evaluate the function:

$f(i,j)$==0 (if hard, otherwise within a tolerance) a.

which is satisfied as long as the bivariate function f(i,j)==0 evaluates as true, e.g., no deviation between L and R, and the placement condition can be made for that availability AD. Otherwise, there may be specified a tolerance that can be satisfied, e.g., 1 level deviation. Then, if the function evaluates to true, the two LE's will be placed at the PE's level in the topology tree. Afterward, as a side-effect resulting from the placement decision, the $X_{ij}$ availability variables are set to the achieved (tree) levels.

In one embodiment, a shared resource allocation domain and shared resource ADA run associated operations for supporting constraints that implement resources that are shared among PEs, such as licenses. The operations include resource (license) addition/deletion, client (PE) registration/de-registration, and implementation of specific sharing policies, e.g. instance license, a Processor Value Unit (PVU) license. A "shared resource" AD model could represent a license, for example. The associated operations on the shared resource include, for example: canUse(resource), use(resource), and release(resource), etc.

Given the domains structure discussed above, a topology domain agent of an example tree topology include operations for implementing a pairwise primitive Affinity Constraint (LaAC), specifying the two LEs, the desired level in the tree, and the hardness of the constraint (a pairwise policy); or a group policy. Thus, further operations include: implementing pairwise or group constraint policies, and logic for mapping such constraints to primitive LaAC constraints and the logic to identify redundant affinity constraints to simplify the task of the optimizer.

Thus, in the methods implemented by the system of FIG. 1, there can be introduced into a cloud computing architecture, a new allocation domain, e.g., a new security domain introduced, or new legal obligations to be complied with, e.g., how to place an application across two data centers, for example. For any new allocation domain, the system 10 permits writing and deploying of an AD agent for the specific new domain to implement a same interface as all other AD agents so the optimizing placement algorithm does not have to change or be rewritten. Familiarity with the new allocation domain enables the writing of a new function specific for that availability domain, the new variables, the new Boolean expression for evaluating the function when making a placement decision, and the resulting side-effects to the variables. The system 10 receives inputs when adding a new constraint to the placement algorithm including: the primitive variables implicated by the new domain, the new function definition specific to the new domain, the Boolean expression and side-effects. The system will take these definitions and the placement algorithm at the optimizer 60 will work with the new allocation domain. The optimization placement algorithm works with the new placement allocation domain described. The system 10 takes these inputs for a new allocation domain (the variables, function, allocation policy) and creates code that will work with enable the optimization algorithm to work with the new allocation domain. With more specificity, the ADM API interface 52 between the optimization algorithm and the allocation domain enables the optimizing algorithm to communicate with agents 57 (via the ADM manager) to perform the following functions:

a. canAllocate (le, pe): This operation, called by the biasing component 60, enables the agent to check if the boolean expression of the allocation policy specification of the Allocation Domains are satisfied if logical entity le is placed on physical entity pe. This routine asks if the constraint can be satisfied.

b. allocate (le, pe): This operation, called by the biasing component 60, enables the agent to perform the post allocation change of the policy specification of the Allocation Domains given that logical entity (le) is placed on physical entity (pe). This routine asks the system to make the allocation.

c. deAllocate (le): This operation enables the agent to reverse the post allocation change of the policy specification of the Allocation Domains given that logical entity le is removed from the cloud system 100. This routine asks the system to release the resources.

Examples of allocation domains include but are not limited to: dedicated resources, shared resources, affinity topology, and networking. A Physical entity may be a client of one or more domains. For example a Physical Machine (PM) as a PE is a client of the dedicated resources domain, realized as a simple reference to the resources associated with it. In addition, the PM may be a client of the shared resources domain as it may be a holder of some license that is shared among a number of PMs. Furthermore, a PM may be a client of an affinity topology domain, represented as a leaf node in a topology tree that is managed by that ADA.

Returning back to FIG. 3, there is further depicted the architecture of the various ADAs and the ADM, particularly showing operative communication and interaction between the ADM 59 and the biased sampling optimizer component 60 through an application programming interface (API) 52 for use in automatically generating deployment decisions for a particular application based on the optimization objectives and the workload constraints.

As further shown in the system of FIG. 1, in one embodiment, via the placement interface 15, both the allocation constraints 26 and optimization objectives 46 are used to create biasers 85. The system and method 10 particularly deploys an application involving biasers 85 wherein each biaser is a construct used in a statistical approach based on importance sampling (also known as cross-entropy) that solves a particular application resource placement problem. More particularly, a Biaser 85 corresponds to an optimization objective or an allocation constraint. In the former case, the Biaser leads to a solution which achieves the optimization objective. And, in the latter case, the Biaser leads to a solution which satisfies the allocation constraint. The Biaser gets the current cloud infrastructure state from the CSM, and computes the bias factors based on the current state and the respective optimization objective or allocation constraint. The Biaser maintains a set of primitive variables, an objective function of such primitive variables, and a bias function, related to its objective function.

In one embodiment, the Biaser 85 is a component used by the Biased Sampling Optimizer 60 to bias the distribution from which samples (i.e., placement solutions) are drawn, towards sampling good (optimal) solutions. The system 10 implements biasers 85 to enhance the importance-based sampling method by biasing the sampling process to incorporate communication needs and other constraints of the application requests.

Thus, to accommodate new objectives/goals and related policies, for both cloud users 11 and cloud providers 13, in a workload placement cloud environment, the system 10—including a placement engine, assignment optimizer—embodied as methods within Biased Sampling Optimizer 60, allows the specification of additional optimization objectives; assigns virtual to physical entities, such that it accommodates different requirements and objectives; uses a flexible optimization algorithm that solves a customizable optimization problem; and performs initial (pre-) as well as on-going, dynamic (re-) assignment (migration).

The system 10—including a placement engine, assignment optimizer—embodied as methods within Biased Sampling Optimizer 60, further accepts a flexible objective function as input, creates an appropriate biasing function which generates near-optimal solutions, and optimizes the objectives in a way that adjusts itself depending on the objectives. As the objectives change, due to actions from system administrators or changes in business policies, the system optimizes itself accordingly and still produces efficient and optimized placement solutions.

The system of FIG. 1 provides the ability for adding and deleting biasers 85 via the placement interface 15 into the cloud computing architecture 12.

As shown in FIG. 1, each biaser 85 is further shown in operative communication with the biased sampling optimizer component 60 via a biasing manager (BM) application programming interface 82. The Biased Sampling Optimizer 60 is the core component which solves the placement optimization problem. It produces a placement result 63 for each received placement request. The result is a mapping of LEs in the request to PEs in the Cloud Infrastructure 12.

Figure 4:
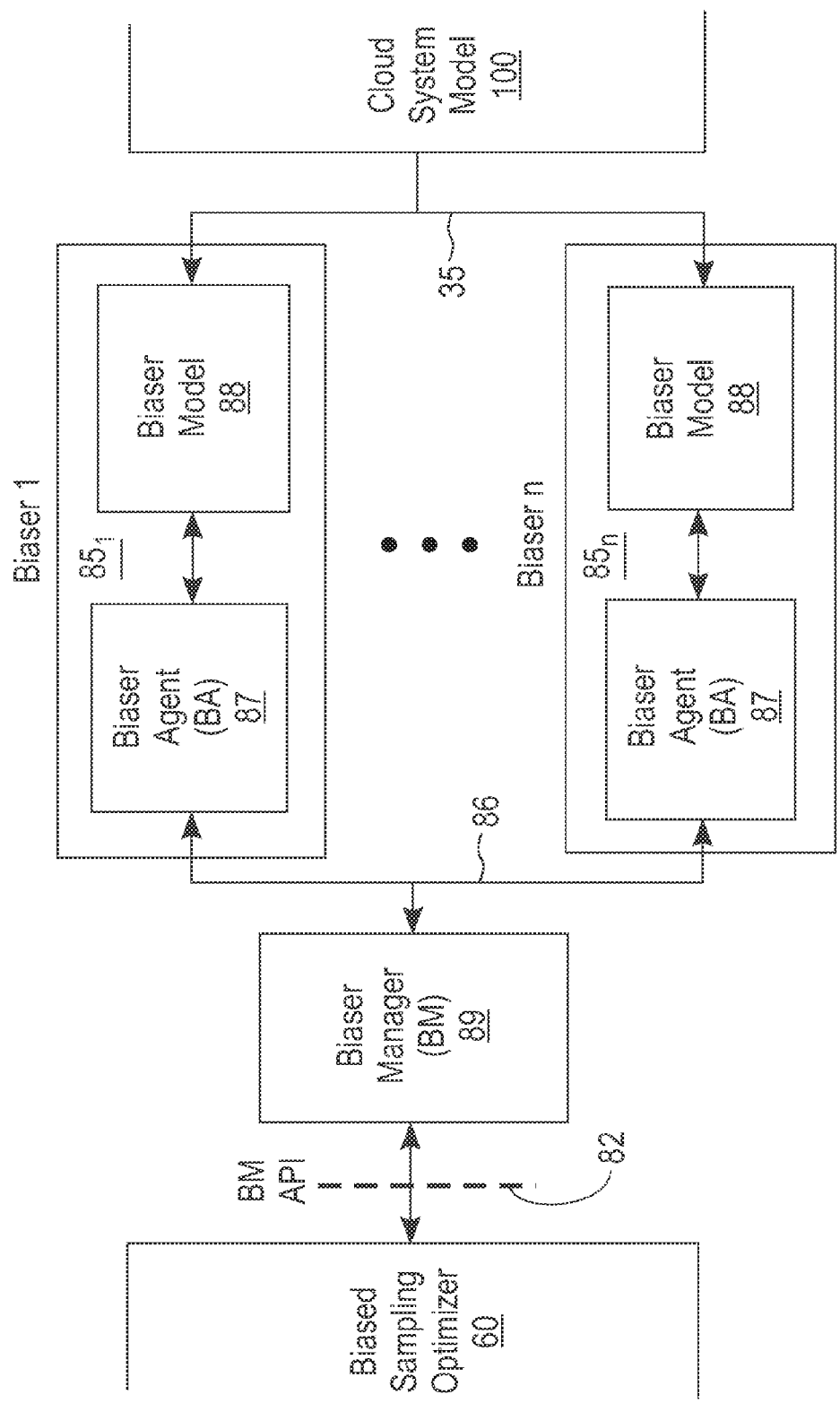
FIG. 4 depicts the biaser creating component of the system of FIG. 1 according to one embodiment.

As further shown in FIG. 4, biasers $85_1, \ldots, 85_N$ are each shown being managed by a biasing agent (BA) 87 and all agents are managed via communications lines 86 by a Biasing Manager (BM) 89. A Biaser Agent (BA) implements the BM API interface, in order to be queried by the BM. The logic of each Biaser is maintained in the implementation of its BA. The Biaser Manager (BM) 89 is the one point interface between the Biased Sampling Optimizer and the Biasers. It implements the BM API interface 82. The BA of each Biaser registers with the BM.

Within each biaser $85_1, \ldots, 85_N$, the BA 87 cooperatively interacts with a corresponding Biaser Model 88 in order to provide a sampling biasing decision for a particular placement request. More particularly, the Biaser Model 88: maintains data specific to the Biaser. Namely, this includes data about primitive variables, an objective function of such primitive variables, and the biasing function, related to its objective function. Quantities related to the primitive variables, objective function, and bias function are derived from the CSM.

In the architecture, the biaser model 88 implementation is also depicted generally in FIG. 4 showing where the X represents a vector of variables representing the state of the cloud infrastructure 175 including physical entities 180, 182 representing a respective host i, j or PM i, j, and a (physical) communication connection entity 185, representing a link or path in a network between the two hosts i and j. A collection of primitive variables, e.g., vectors Xi and Xj are related to the respective physical entities, e.g., a host i or host j, and include data representing a state of the PE (e.g., CPU, core utilization, a memory size, etc.) which primitive variable is specific to or relating to the PE. Primitive variables are associated with a pair of host devices may include a variable Xij which is a 2D construct relating to two or more consumable resources PEs (e.g., hosts i and j), e.g., a communication connection entity (link or path between two nodes). These variables are measureable and obtain a metric as to a variable value at an instant of time.

In one embodiment, the Biased Sampling Optimizer 60 component focuses on optimizing the placement optimization, given an objective function to be minimized or maximized. In one embodiment, the optimizer 60 receives a scalar objective function G(X) and minimizes this function. The scalar objective function G(X) is a weighted combination of an extensible collection of objective functions g(X), i.e., from both the cloud user and cloud infrastructure provider (e.g., who wants efficient use of resources and may turn off machines). In one embodiment, the combination may be a sum of (or product of) the objective functions g(X). Their objectives are variable and may change over time as do the weights which represents how important that objective is (an importance sampling weight). The operation of the optimization algorithm in optimizer 60 is flexible, i.e., is automatic and robust and independent of the goals and the particular objectives specified in the objective function. The objective function G(X) is thus customizable (and changes), without requiring re-writing of the placement optimization algorithm. Placement algorithms are known in the art such as the algorithm described in a reference to A. Tantawi entitled "A scalable algorithm for placement of virtual clusters in large data centers", in Modeling, Analysis & Simulation of Computer and Telecommunication Systems (MASCOTS), 2012 IEEE 20$^{th}$ International Symposium on, pp. 3-10, IEEE, 2012, the whole contents and disclosure of which is incorporated by reference as if fully set forth herein. This algorithm is directed for optimal placement that is based on importance statistical sampling however, it does not teach supporting flexible workload objectives much less the automatic creation of bias functions.

Thus, the system 10 receives the new formed objective function as input to the algorithm, e.g., g(X)=Variance(X). The methods implemented by a bias creator that creates the appropriate biasing functions ($B_i$) for the new objective function $g_i$(X) biases the solution to generates near-optimal solutions (e.g., toward a particular placement solution), and optimizes the objectives in a way that adjusts itself depending on the objectives.

In one embodiment, the bias model's Biasing function B, for objective g(X) is inversely proportional to a computed/derived partial derivative of g(X) with respect to host i variables.

In one embodiment, the minimizing is a performed by the Biased Sampling Optimizer 60. As mentioned, biasers 85 are created from optimization objectives. For example, biasers 85 may include, but are not limited to: a Load Biaser: which provides a bias function tending to favor distributing the load if there exists an objective of load balancing; a Network Biaser: which provides a bias function tending to place communicating virtual entities close to each other to avoid networking traffic in case there is an objective to minimize networking overhead; a License Biaser: which provides a bias function that increases license sharing in order to minimize software licensing cost; and a Location Biaser: which provides a bias function tending to minimize deviation from location user preferences related to placement of virtual entities with respect to each other. These biasers help find good solutions to the optimization placement solution faster in a more efficient way.

In the system 10, as new objectives are introduced in a placement request, the new biasing functions are created for them (each objective has a biaser).

An example biasing function that may be instantiated by the methods herein include a load balancer objective to balance CPU utilization with respect to host devices (e.g., equal usage across all machines), the scalar variable X represents each of the hosts, i.e., a. $X=[X_1,X_2,\ldots,X_n]$, where $X_i=u_i$ and is a vector representing a cpu_utilization of each host i. In this example, the objective function g(X) to be minimized is the variance to ensure all host PM resources are consumed equally. In one embodiment, an expression for g(X) is given as:

b. $$g(X) = 1/n \sum_{i=1}^{n} (u_i - u_{avg})^2$$

where $u_i$ is the cpu_utilization weight of the host i and the objective function is a variance represented by the variance term $(u_i-u_{avg})^2$ to be minimized.

In one embodiment, an instantiated bias function B, for objective $g_i$(X) (after taking the partial derivative) includes:

a. $B_i=(1-u_i)$=bias towards host i.

A large 1-utilization value means that host i has a lot of available resources and will bias the placement solution accordingly. For balancing cpu utilization objective among hosts, the placement solution will prefer host with low utilization (high availability).

In a further example, for adding to the system a user or provider load balancer objective to balance core links (e.g., traffic on high-speed links) between two host devices (e.g., equal usage across all machines), the scalar variable X represents each of the hosts, i.e., a. X=[Xc], where $X_c=u_c$ and is a quantity representing a utilization of core link c. The function to be minimized is the variance (g(X)=Variance(X) to ensure all links are utilized equally). In one embodiment, an expression for g(X) is given as b. $$g(X) = 1/n \sum_{c=1}^{n} (u_c - u_{avg})^2$$

where $u_c$ is the utilization of the core link c and the objective function is a variance represented by the term $(u_c-u_{avg})^2$ to be minimized.

The Bias function $B_i$ for objective g(X) is the sum over a core link c in path from host i to all hosts j where communicating LEs are placed $(1-u_c)$. Thus, the bias function will influence the optimizing placement solution to prefer a host i with low core links utilization (a core link having high 1-utilization bias value) to other hosts within application.

As further depicted in FIGS. 1 and 4, the various Biasers 85 that receive updated compute model state information from the cloud system model 100 via communication lines 33 to update host PE and link resource allocation, consumption or utilization. The updated cloud infrastructure state provided to biasers 85 are received from and reported by the cloud infrastructure 12 which provides the updated infrastructure state information 77 to the CSM 100 via the cloud interface 75.

The optimization placement algorithm works with the new objective functions as described. The system 10 takes these biasers 85 as inputs for making sampling decisions. In one embodiment, the BM API interface 82 is an interface enabling the optimization algorithm to communicate with the agents 87 (via the BM manager) and perform the following functions:

a. update(le,pe):

To update the Biaser model to reflect the fact that logical entity le is placed on physical entity pe; and a. getBias(le):

Get the biasing function for the placement of logical entity le, given the current status of the Cloud System Model 100.

Figure 2:
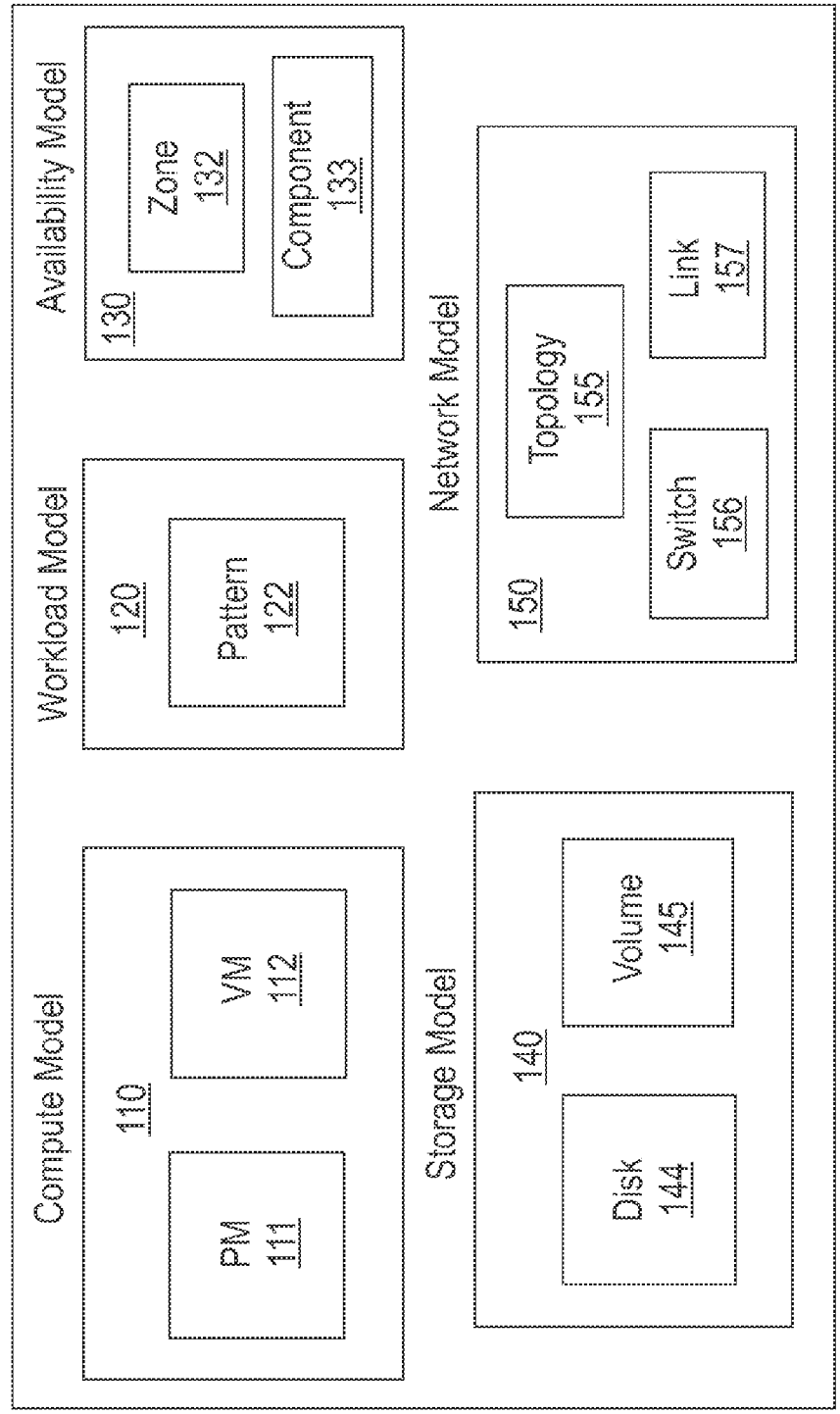
FIG. 2 depicts a cloud computing system model according to one embodiment providing current cloud infrastructure state information to the cloud computing system of FIG. 1.

In one embodiment, the cloud system model 100 from which biasers and allocation domains are created based on physical infrastructure resource availability and constraint or objectives updates is depicted in FIG. 2. The cloud system model 100 is a representation of the observed state of the cloud at a given point in time. The model is built at startup time by learning the physical entities, their attributes, and their interconnections from the observed state. Then, periodically and/or upon request, the model is updated to reflect the current state of the cloud through a Builder/Updater component (not shown). The cloud system model 100 includes several models, examples of which are the compute model 110, workload model 120, availability model 130, storage model 140 and a network model 150. These model the software defined compute, software defined storage, and software defined network abstractions, respectively. The models related to availability, and security are also included in the cloud system model. For example, availability zones may be represented by a containment hierarchical tree model. Further models of all workloads, whether deployed or yet-to-be-deployed, are reflected in the cloud system model. As a placement decision for a given workload is made, the state of the cloud system model is changed to reflect the decision. Further, at time of migration, requirements of already deployed workloads need be verified through the workload models.

In a further embodiment, an Evaluator component (not shown) calculates performance metrics based on data collected from the cloud system model 100 and the cloud infrastructure 12. Such metrics are collected over time and analyzed, yielding information about the behavior of the placement function, the satisfaction of workload requirements, and the overall performance of the cloud.

In one aspect, the compute model 110 include the PMs 111 and racks thereof across the infrastructure, and VMs 112 deployed for the workload. Each VM is associated with a set of properties such as CPU and memory size or flavor and image identifier.

The workload model 120 includes the pattern 122 which depicts logical groups of homogeneous logical entities.

The availability model 130 includes a zone 132 that may be represented by a containment hierarchical tree model defined over the infrastructure and influence workload availability. For example, a location relationship between two hosting physical entities may require them to be within (collocated) or beyond (anti-collocated) a given level in the tree hierarchy. The model 130 further includes a listing all workload components 133 that are available and/or need to be provisioned and relationships among them.

The storage model 140 includes disks 144 that represent physical storage (STG) devices that are deployed or used by the workload, and Volumes that are deployed or used by the workload. For example, each volume is associated with its type, size, and advanced properties such as replication factor. The VMs include groups of VMs (or volumes) with the same set of deployment properties.

The network model 150 includes network connectivity relationships including the current state of the network topology 155, including state of network switches 156, and a status of links 157 that enable entities to communicate, which is defined through properties such as bandwidth and/or delay requirements and firewall rules.

Figure 6:
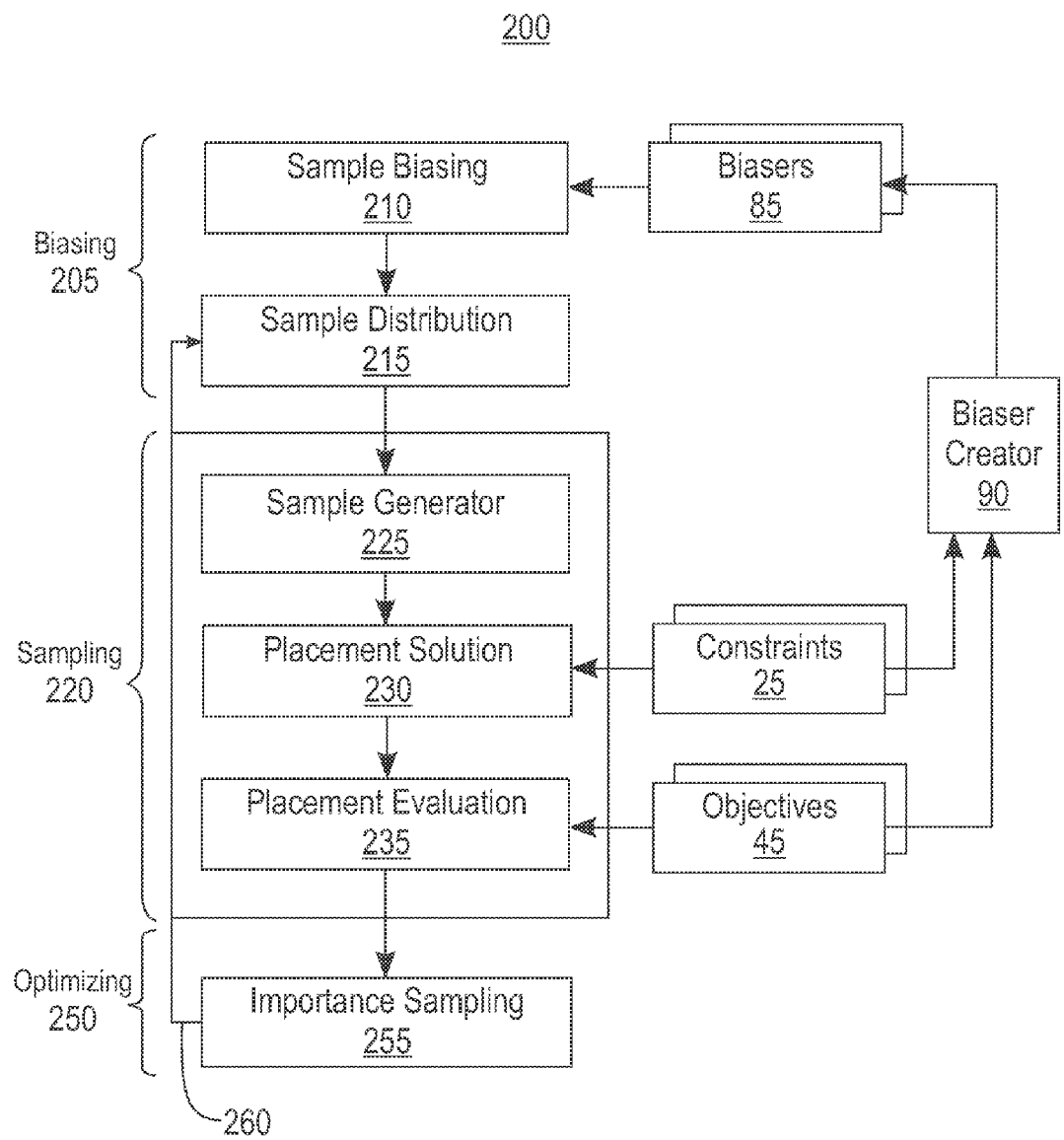
FIG. 6 depicts generally the placement optimization algorithm incorporating the use of requirements/constraint allocation domains and biasing functions according to one embodiment.

FIG. 6 depicts generally the placement optimization methodology incorporating the use of requirements/constraint allocation domains and biasing functions according to one embodiment. As shown generally in FIG. 6, the methodology 200 implemented at the component 60 includes, but is not limited to: a biasing step 205 the biasing comprising a sequence of steps including a sample biasing step 210 to apply the biasers 85 generated by the bias creators 90 to the objective functions, and sample distribution steps 215 for computing sample probability distributions; a second series of sampling steps 220 implements a sample probabilistic generator 225 that works with the biased probability distribution computed in the biasing step and generates several placement solutions (samples) based on the computed biased sample probability distributions. At step 230, there is generated one or more candidate placement solutions 230 that satisfy the received allocation constraints 25 generated by the system 10, and a placement evaluation step 235 for evaluating the candidate placement solution in response to received biased objectives 45. A final optimizing step 250 is implemented to find an optimized placement solution. In one embodiment, the optimizing step 250 implements an importance sampling technique 255. The importance sampling technique provides feedback 260 for the sample distribution method in order to update the biasers 85 based on the importance sampling results for a subsequent placement solution computation iteration.

In one embodiment, the biaser creator 90 may be embodied by a domain expert familiar with the physical infrastructure who would map components of the objective function to individual biasing functions. For example, for the load biaser cpu utilization, the bias probability associated with a particular host may be set proportional to the amount of resources available on that host.

In a second embodiment, a learning system is implemented, e.g., to conduct semi-supervised training steps. The goal is to identify a biasing function which if used in the Biased Sampling Optimizer produces optimal placement solutions. The biasing function is parameterized using parameters collected from the state of the cloud as well as values of quantities in the constraints and objectives of the application request. Examples of such parameters are resource utilization, resource demands, level and hardness of level constraints, cost and budget values, etc. The goodness of a given placement solution is judged through the evaluation of the objective function. In one embodiment, the learning technique would characterize the relationship between the chosen parameters and the goodness of the placement solution, in an attempt to identify the functional form of the biasing function. Of course, this learning process requires the processing of many placement requests. Needless to say that during the learning phase some placement solutions will not be optimal. However, once the form of the biasing function is learned, the Biased Sampling Optimizer will produce optimal placement solutions. During the learning phase, the method generates random placement solutions automatically using parameterized biasing functions and calculates corresponding values of the objective function. The method continuously adjusts parameters of the biasing functions so as to generate optimal placement solutions. The system is continuously observed with the bias changed at each iteration to obtain a most optimal solution. Thus, in one embodiment, this bias function may be computed over time.

Figure 7:
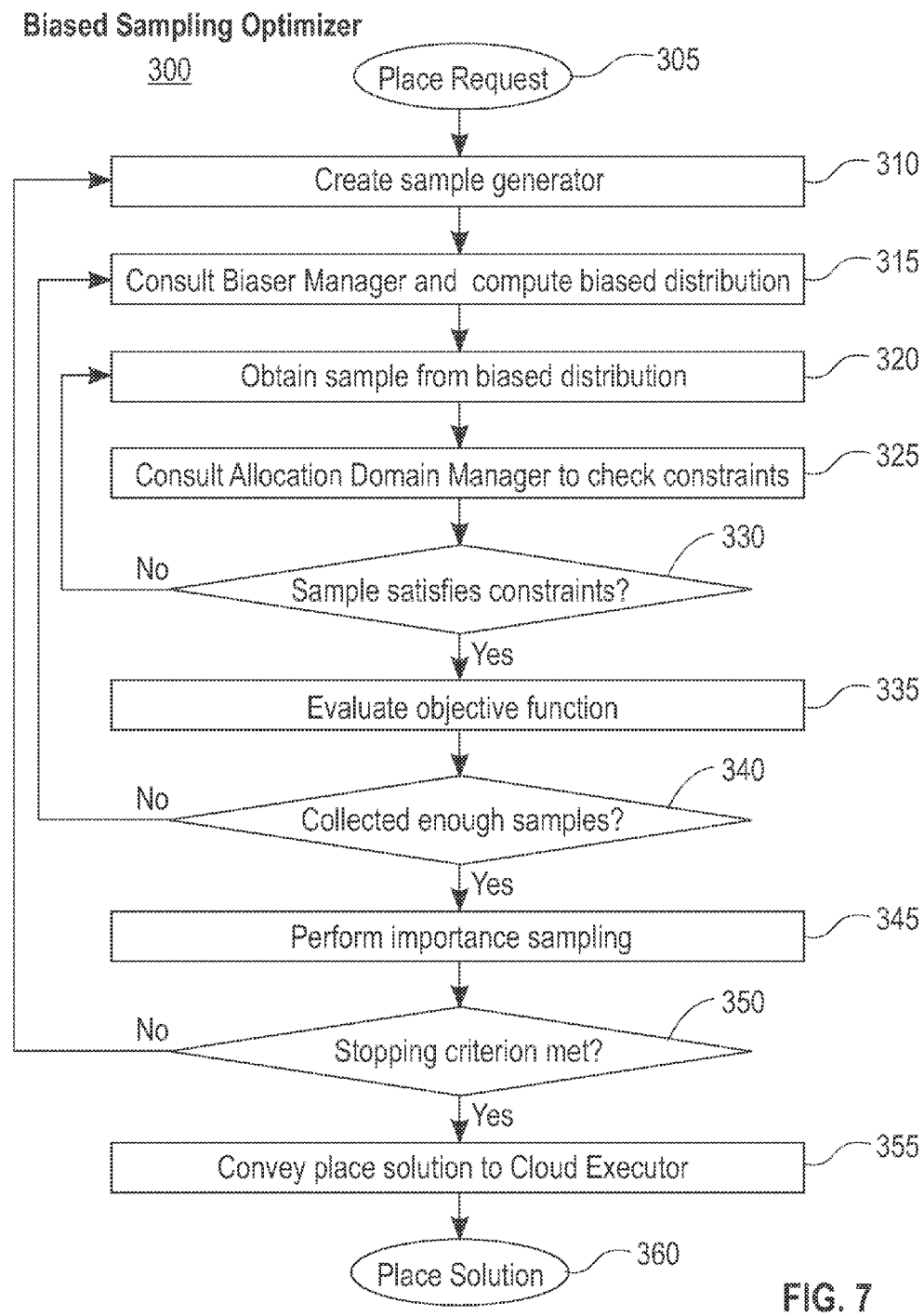
FIG. 7 depicts an iterative biasing sampling optimizer method implemented by the system in FIG. 1 for providing optimized placement solutions according to one embodiment.

FIG. 7 depicts an iterative biasing sampling optimizer method 300 implemented by the cloud resource management system 10 of FIG. 1 for providing optimized placement solutions according to one embodiment. The method 300 implements a cloud scheduler framework that takes as input desired optimization objectives and the workload constraints and efficiently produces a placement that satisfies the constraints while optimizing the objectives in a way that adjusts itself depending on the objectives. As shown at first step 305, the management system receives a workload request. Then, at 310, the method creates a sample generator to generate candidate placement solutions. At 315, the Bias Manager element is accessed to obtain a biasing function used for computing a probability distribution that are weighted using the Biasing functions which make optimal placement solutions more likely to be generated. Then at 320, the method obtains a sample placement solutions from the biased distribution. At 325, the method consults the allocation domain manager to check constraints for the allocation domain implicated in the received workload request and determine the viability of this biased sample as a LE placement solution. This involves, at 330, checking the sample placement solutions against the constraints, i.e., the allocation policy for a specified AD, and using only the valid samples to evaluate an objective function combining all desired objectives. If the biased sample does not satisfy the AP, then the method returns to step 320 where other biased samples are obtained from the biased distribution and the steps 325-330 are repeated. Once, at step 330, it is determined that the sample satisfies the constraints, then the process continues to step 335 where an evaluation of the objective function as biased is made using the obtained valid samples. Continuing at 340, a determination is made as to whether enough samples have been collected. If not enough samples have been collected for evaluation, then the process continues to step 315 to compute a further biased distribution by again consulting the Bias Manager and generating a further distribution of biased samples. Then steps 320 through 340 are repeated until it is determined that enough valid placement solution samples have been collected that meet the specified allocation domain constraints. Thus, once a sufficient number of biased samples have been met at 340, the process proceeds to step 345 in order to perform importance sampling for the collected biased samples. Such an optimized placement algorithm will utilize the technique in the herein incorporated reference entitled "A scalable algorithm for placement of virtual clusters in large data centers" found in Modeling, Analysis & Simulation of Computer and Telecommunication Systems (MASCOTS), 2012, IEEE 20th International Symposium.

In a further embodiment, an optimized placement algorithm may include a technique which utilizes (1) importance sampling as a mechanism for describing the optimal solution through marginal distributions, (2) independent sampling via a modified Gibbs sampler with intra-sample dependency, and (3) a jumping distribution that uses conditionals derived from the relationship constraints given in the user request and cloud system topology, and the importance sampling marginal distributions as posterior distributions.

Whichever placement algorithm and importance sampling technique is used, the method proceeds to step 350 to determine if a stopping criteria has been met, e.g., has the solution been optimized such that the same value of the objective function has been reached in two consecutive iterations, or reaching a maximum number of iterations, e.g., 10 iterations. If the stopping criteria has been met at 350 then the method proceeds to step 355 to convey the optimized placement solution to the Cloud Executor entity that takes the placement solution as input and effects placement of the solution at step 360 (i.e., requests the cloud infrastructure its realization through the management interface) in the cloud.

If, at step 350, it is determined that the stopping criterion has not been met, then the process returns to step 310 to refine the biased probability distributions used and the whole method from step 310 to 350 is repeated until the most optimal solution is obtained.

As the objectives change, due to actions from system administrators or due to changes in business policies, the system optimizes itself accordingly and still produces efficient and optimized placement solutions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 8:
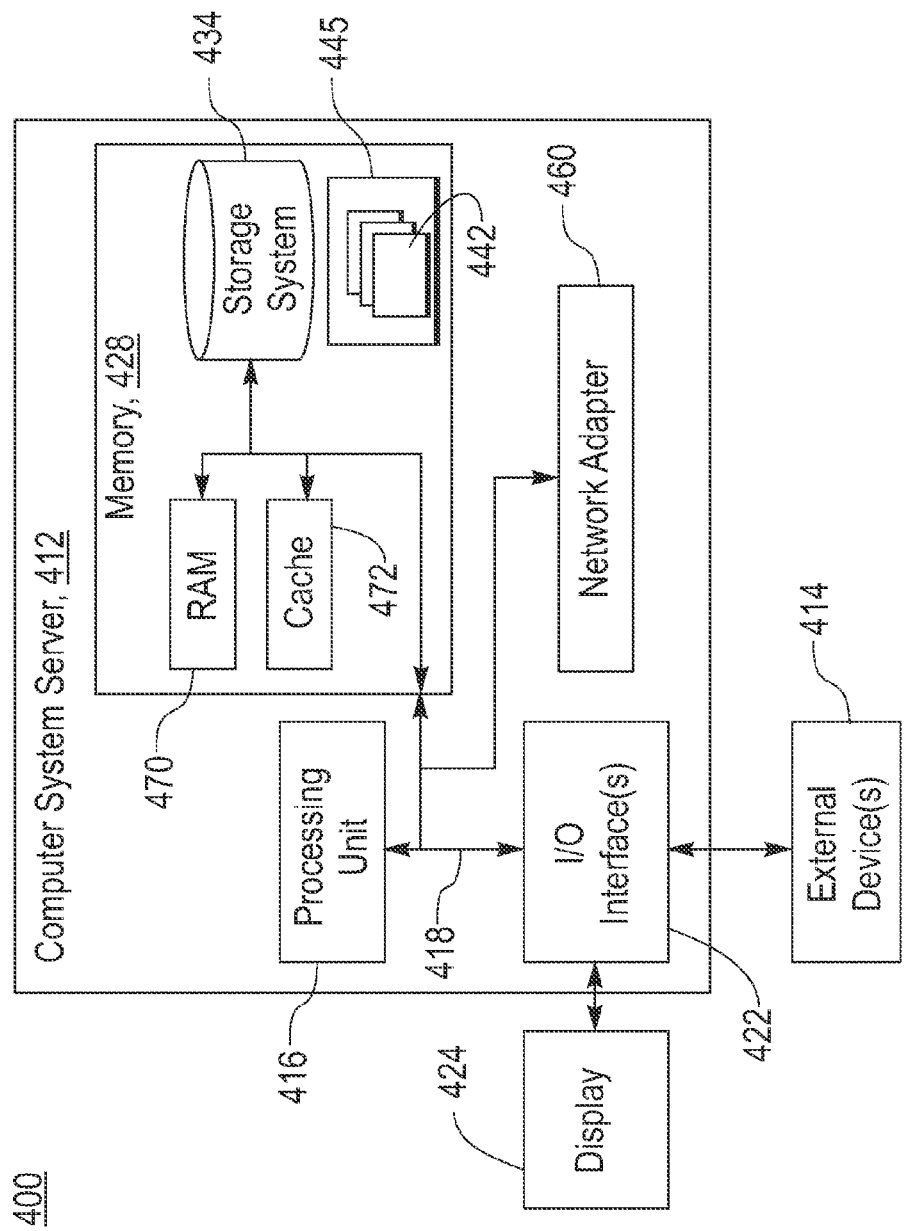
FIG. 8 depicts a cloud computing node according to an embodiment.

Referring now to FIG. 8, a schematic of an example of a cloud computing node is shown. Cloud computing node 400 is only one example of a suitable cloud computing node and is not intended to suggest any limitation as to the scope of use or functionality of embodiments of the invention described herein. Regardless, cloud computing node 400 is capable of being implemented and/or performing any of the functionality set forth hereinabove.

In cloud computing node 400 there is a computer system/server 412, which is operational with numerous other general purpose or special purpose computing system environments or configurations. Examples of well-known computing systems, environments, and/or configurations that may be suitable for use with computer system/server 412 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 412 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 412 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer system/server 412 in cloud computing node 400 is shown in the form of a general-purpose computing device. The components of computer system/server 412 may include, but are not limited to, one or more processors or processing units 416, a system memory 428, and a bus 418 that couples various system components including system memory 428 to processor 416.

Bus 418 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 412 typically includes a variety of computer system readable media. Such media may be any available media that is accessible by computer system/server 412, and it includes both volatile and non-volatile media, removable and non-removable media.

System memory 428 can include computer system readable media in the form of volatile memory, such as random access memory (RAM) 470 and/or cache memory 472. Computer system/server 412 may further include other removable/non-removable, volatile/non-volatile computer system storage media. By way of example only, storage system 434 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 418 by one or more data media interfaces. As will be further depicted and described below, memory 428 may include at least one program product having a set (e.g., at least one) of program modules that are configured to carry out the functions of embodiments of the invention.

Program/utility 445, having a set (at least one) of program modules 442, may be stored in memory 428 by way of example, and not limitation, as well as an operating system, one or more application programs, other program modules, and program data. Each of the operating system, one or more application programs, other program modules, and program data or some combination thereof, may include an implementation of a networking environment. Program modules 442 generally carry out the functions and/or methodologies of embodiments of the invention as described herein.

Computer system/server 412 may also communicate with one or more external devices 414 such as a keyboard, a pointing device, a display 424, etc.; one or more devices that enable a user to interact with computer system/server 412; and/or any devices (e.g., network card, modem, etc.) that enable computer system/server 412 to communicate with one or more other computing devices. Such communication can occur via Input/Output (I/O) interfaces 422. Still yet, computer system/server 412 can communicate with one or more networks such as a local area network (LAN), a general wide area network (WAN), and/or a public network (e.g., the Internet) via network adapter 420. As depicted, network adapter 460 communicates with the other components of computer system/server 412 via bus 418. It should be understood that although not shown, other hardware and/or software components could be used in conjunction with computer system/server 412. Examples, include, but are not limited to: microcode, device drivers, redundant processing units, external disk drive arrays, RAID systems, tape drives, and data archival storage systems, etc.

Figure 9:
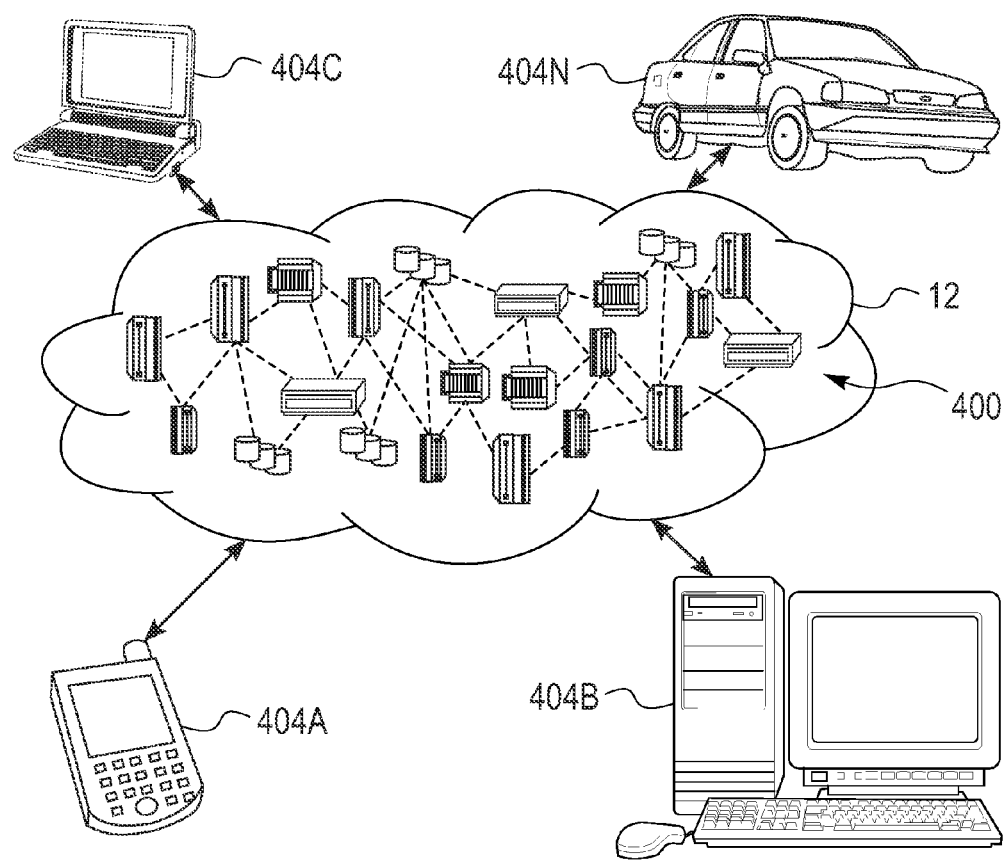
FIG. 9 depicts a cloud computing environment according to an embodiment.

Referring now to FIG. 9, illustrative cloud computing environment 12 is depicted. As shown, cloud computing environment 12 comprises one or more cloud computing nodes 400 with which local computing devices used by cloud consumers, such as, for example, personal digital assistant (PDA) or cellular telephone 404A, desktop computer 404B, laptop computer 404C, and/or automobile computer system 404N may communicate. Nodes 400 may communicate with one another. They may be grouped (not shown) physically or virtually, in one or more networks, such as Private, Community, Public, or Hybrid clouds as described hereinabove, or a combination thereof. This allows cloud computing environment 12 to offer infrastructure, platforms and/or software as services for which a cloud consumer does not need to maintain resources on a local computing device. It is understood that the types of computing devices 404A-N shown in FIG. 9 are intended to be illustrative only and that computing nodes 400 and cloud computing environment 12 can communicate with any type of computerized device over any type of network and/or network addressable connection (e.g., using a web browser).

Referring now to FIG. 10, a set of functional abstraction layers provided by cloud computing environment 450 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 450 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 452 provides an abstraction layer from which the following examples of virtual entities may be provided: virtual servers; virtual storage; virtual networks, including virtual private networks; virtual applications and operating systems; and virtual clients.

In one example, management layer 454 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

In one embodiment, the system and method that perform allocation domain modeling and cloud scheduler framework that takes as input desired optimization objectives and the workload constraints and efficiently produces a placement solution that satisfies the constraints while optimizing the objectives in a way that adjusts itself depending on the objectives is employed at this management layer 454.

Workloads layer 456 provides examples of functionality for which the cloud computing environment may be utilized. Examples of workloads and functions which may be provided from this layer include: mapping and navigation; software development and lifecycle management; virtual classroom education delivery; data analytics processing; transaction processing; and question-answer processing.

While various embodiments are described herein, it will be appreciated from the specification that various combinations of elements, variations or improvements therein may be made by those skilled in the art, and are within the scope of the invention. In addition, many modifications may be made to adapt a particular situation or material to the teachings of the invention without departing from essential scope thereof. Therefore, it is intended that the invention not be limited to the particular embodiment disclosed as the best mode contemplated for carrying out this invention, but that

What is claimed is:

1. A system for operating a cloud computing system comprising:
a memory storage device; and
a processor device, coupled to the memory storage device, and configured to:
receive a user application request having one or more user specified objectives and allocation constraints, said user request specifying requirements for placing logical entities on physical entities in a computing infrastructure;
generate one or more bias weights based on said user specified objectives and allocation constraints by employing an allocation domain that is created using a set of primitive variables, a set of functional definitions for the set of primitive variables, a policy specification for the set of functional definitions, and at least one post-allocation change to the set of primitive variables;
compute a probability distribution using said bias weights, said bias weights increasing likelihood of generating an optimized placement solution;
generate, using said biased computed biased probability distribution, several sample placement solutions;
obtain an optimized placement solution from said several sample solutions that satisfies all said user specified objectives and said user specified allocation constraints; and
dynamically reconfigure the computing infrastructure by allocating the logical entities in the request to the physical entities based on said optimized placement solution.

2. The system according to claim 1, wherein to obtain an optimized placement solution, said processor device is further configured to:
evaluate said several sample placement solutions using an objective function based on a combination of said user objectives and allocation constraints, and
obtain said optimized placement solution based on said objective function evaluating that satisfies combined user objectives and constraints given a current state of resources in said computing infrastructure.

3. The system according to claim 2, wherein said processor device is further configured to:
iteratively repeat computing said probability distribution using said bias weights, said generating several placement solutions and said optimizing to obtain the optimized placement solution that satisfy said user objectives and constraints; and
adjust, at each iteration, said bias weights to generate more optimized sample placement solutions at each successive iteration.

4. The system according to claim 3, wherein to adjust said bias weights, said processor device is further configured to:
maintain a set of variables, a variable representing a state of PE resources and an objective for placing a logical entity on a physical entity;
specify one or more objective functions using said variables set, a function defining a condition for allocating an LE to a PE based on a current state of said computing (cloud) infrastructure; and
create a biasing function related to the objective function and the current infrastructure state.

5. A system for operating a cloud computing system comprising:
a memory storage device; and
a processor device, coupled to the memory storage device, and configured to:
receive a user application request having one or more user specified objectives and allocation constraints, said request specifying requirements for placing logical entities (LE) on physical entities (PE) in a computing infrastructure;
construct an allocation domain (AD) corresponding to each received user specified allocation constraint, each AD representing a particular allocation of a LE to a PE in a sample placement solution in said computing infrastructure; wherein the AD is created using: a set of primitive variables, a set of functional definitions for the set of primitive variables, a policy specification for the set of functional definitions, and at least one post-allocation change to the set of primitive variables;
dynamically create an allocation policy specific to an allocation domain; and
evaluate each said generated sample placement solutions against an allocation policy corresponding to each said one or more allocation domains for a particular received application request to ensure compliance of said allocated constraints in said cloud infrastructure.

6. The system as in claim 5, wherein to construct an allocation domain, said processor device is further configured to:
create and modify one or more variables for said AD, each variable representing a state of PE resources and an allocation constraint for placing a LE on a PE;
specify one or more functions using said one or more AD variables, a function defining a condition for allocating an LE to a PE based on a current state of said computing infrastructure.

7. The system as in claim 6, wherein said processor device is further configured to:
evaluate each of said one or more functions associated with one or more AD variables implicated by said received user application request;
make an LE placement on a PE of a computing infrastructure based on said function evaluation that satisfies said allocation policy; and
update AD variables resulting from the LE placement.

8. The system as in claim 6, wherein to evaluate each of said one or more functions, said processor device is further configured to:
implement a Boolean expression to determine whether each of said one or more functions associated with one or more AD variables implicated by said allocation constraints of said application placement request, are satisfied.

9. A computer program product comprising a computer readable storage medium tangibly embodying a program of instructions executable by the computer for operating a cloud computing system, the program of instructions, when executing, performing the following steps:
receiving a user application request having one or more user specified objectives and allocation constraints, said user request specifying requirements for placing logical entities on physical entities in a computing infrastructure;
generating one or more bias weights based on said user specified objectives and allocation constraints by employing an allocation domain that is created using a set of primitive variables, a set of functional definitions for the set of primitive variables, a policy specification for the set of functional definitions, and at least one post-allocation change to the set of primitive variables;

computing a probability distribution using said bias weights, said bias weights increasing likelihood of generating an optimized placement solution;

generating, using said biased computed biased probability distribution, several sample placement solutions;

obtaining an optimized placement solution from said several sample solutions that satisfies all said user specified objectives and said user specified allocation constraints; and dynamically reconfiguring the computing infrastructure by allocating the logical entities in the request to the physical entities based on said optimized placement solution.

10. The computer program product according to claim 9, wherein said obtaining an optimized placement solution to comprises:

evaluating, said several sample placement solutions, using an objective function based on a combination of said user objectives and allocation constraints, and obtaining said optimized placement solution based on said objective function evaluating that satisfies combined user objectives and constraints given a current state of resources in said computing infrastructure.

11. The computer program product according to claim 10, further comprising:

iteratively repeating said probability distribution computing using said bias weights, said generating several placement solutions and said optimizing to obtain the optimized placement solution that satisfy said user objectives and constraints; and adjusting, at each iteration, said bias weights to generate more optimized sample placement solutions at each successive iteration.

12. The computer program product according to claim 11, wherein said adjusting bias weights comprises:

maintaining a set of variables, a variable representing a state of PE resources and an objective for placing a logical entity on a physical entity;

specifying one or more objective functions using said variables set, a function defining a condition for allocating an LE to a PE based on a current state of said computing (cloud) infrastructure; and creating a biasing function related to the objective function and the current infrastructure state.

13. The computer program product according to claim 12, wherein said obtaining an optimized placement solution comprises:

minimizing a scalar objective function comprising a combination of received objective functions each weighted with a respective weight obtained by an importance-based sampling method and a respective biasing weight applied to each objective function.

14. The computer program product according to claim 13, creating a bias weight using one of:

a domain expert for mapping components of the objective function to individual biasing functions; or a semi-supervised learning system that automatically generates random placement solutions using parameterized biasing functions, calculates corresponding values of the objective function; and continuously adjusts parameters of the biasing functions so as to generate optimal placement solutions.

15. The computer program product according to claim 12, wherein a user objective comprises one or more of:

a load balancing objective, a network communications overhead minimizing objective, a software licensing minimization cost, and a physical proximity deviation minimizing objective; said bias function comprising one or more of:

a load balance biasing function associated with distributing a load based on the load balancing objective;

a network traffic biasing function associated with placement of communicating virtual machines close to each other to avoid networking traffic;

a software license sharing biasing function associated with increasing license sharing to minimize a software licensing cost objective; and a location proximity biasing function for minimizing a deviation from location user preferences related to placement of virtual entities with respect to each other.

16. The computer program product according to claim 10, further comprising:

constructing an allocation domain (AD) corresponding to each received user specified allocation constraint, each AD representing a particular allocation of a LE to a PE in a placement solution in said computing infrastructure;

dynamically creating an allocation policy specific to an allocation domain; and evaluating each said generated sample placement solutions against an allocation policy corresponding to each said one or more allocation domains for a particular received application request to ensure compliance of said allocated constraints in said cloud infrastructure.

17. A computer program product comprising a computer readable storage medium tangibly embodying a program of instructions executable by the computer for operating a cloud computing system, the program of instructions, when executing, performing the following steps:

receiving a user application request having one or more user specified objectives and allocation constraints, said request specifying requirements for placing logical entities (LE) on physical entities (PE) in a computing infrastructure;

constructing an allocation domain (AD) corresponding to each received user specified allocation constraint, each AD representing a particular allocation of a LE to a PE in a sample placement solution in said computing infrastructure, wherein the AD is created using: a set of primitive variables, a set of functional definitions for the set of primitive variables, a policy specification for the set of functional definitions, and at least one post-allocation change to the set of primitive variables;

dynamically creating an allocation policy specific to an allocation domain; and evaluating each said generated sample placement solutions against an allocation policy corresponding to each said one or more allocation domains for a particular received application request to ensure compliance of said allocated constraints in said cloud infrastructure.

18. The computer program product as in claim 17, wherein said constructing an allocation domain comprises one or more of:

creating and modifying one or more variables for said AD, each variable representing a state of PE resources and an allocation constraint for placing a LE on a PE;

specifying one or more functions using said one or more AD variables, a function defining a condition for allocating an LE to a PE based on a current state of said computing infrastructure.

19. The computer program product as in claim 18, further comprising:
    evaluating each of said one or more functions associated with one or more AD variables implicated by said received user application request;
    making an LE placement on a PE of a computing infrastructure based on said function evaluation that satisfies said allocation policy; and
    updating AD variables resulting from the LE placement.

20. The computer program product as in claim 19, wherein said evaluating each of said one or more functions comprises:
    implementing a Boolean expression to determine whether each of said one or more functions associated with one or more AD variables implicated by said allocation constraints of said application placement request, are satisfied.

21. The computer program product as in claim 20, further comprising:
    managing creation, modifying or updating of allocation policy state and said one or more allocation domain variables and functions, using a corresponding AD agent (ADA); and
    managing all corresponding ADAs by an AD manager (ADM), said ADAs and ADM providing a common interfaces to provide a realization of specific ADs applied to the computing infrastructure.

22. The computer program product as in claim 17, further comprising:
    generating one or more bias weights based on said user specified objectives and allocation constraints;
    computing a probability distribution using said bias weights, said bias weights increasing likelihood of generating an optimized placement solution;
    generating, using said biased computed biased probability distribution, several sample placement solutions;
    obtaining an optimized placement solution from said several sample solutions that satisfies all said user specified objectives and said user specified allocation constraints; and
    dynamically reconfiguring the computing infrastructure by allocating the logical entities in the request to the physical entities based on said optimized placement solution.

* * * * *